United States Patent [19]

Coggins et al.

[11] Patent Number: 4,776,269

[45] Date of Patent: Oct. 11, 1988

[54] METHOD OF AGGLOMERATING AND DEWATERING POLYMERIC MATERIALS

[75] Inventors: Richard S. Coggins, Baton Rouge, La.; Richard C. Yeh, Westfield; James P. Norton, Elmwood Park, both of N.J.

[73] Assignee: Exxon Chemical Patents Inc., Linden, N.J.

[21] Appl. No.: 931,070

[22] Filed: Nov. 17, 1986

[51] Int. Cl.$^4$ .............................. B30B 3/04; B30B 9/20
[52] U.S. Cl. ....................................... 100/37; 100/168; 100/176; 210/770; 241/21; 523/324
[58] Field of Search ................... 100/37, 90, 168, 172, 100/176, 121, 93 RP; 68/244; 210/770, 386, 784; 241/21, DIG. 31; 523/324, 335; 528/502; 38/49

[56] References Cited

U.S. PATENT DOCUMENTS

| | | |
|---|---|---|
| 102,628 | 3/1870 | Wakeman et al. .............. 68/244 |
| 1,691,546 | 11/1928 | Farrel, Jr. . |
| 2,236,464 | 3/1941 | Burns ......................... 100/168 X |
| 2,771,689 | 11/1956 | Bettes, Jr. . |
| 2,798,424 | 7/1957 | Smith et al. . |
| 3,222,797 | 12/1965 | Zies . |
| 3,240,746 | 3/1966 | Davis . |
| 3,406,624 | 10/1968 | Kutchera et al. .................. 100/176 |
| 3,527,668 | 9/1970 | Kusters et al. . |
| 3,529,777 | 9/1970 | Dodson et al. . |
| 3,968,742 | 7/1976 | Kerr ................................. 100/37 |
| 4,116,760 | 9/1978 | Kennedy ........................ 100/121 |
| 4,374,573 | 2/1983 | Rouse et al. . |
| 4,396,158 | 8/1983 | Olsen . |
| 4,410,144 | 10/1983 | Imperi . |
| 4,434,713 | 3/1984 | Hartwich et al. ................ 100/168 |
| 4,475,453 | 10/1984 | Davis . |
| 4,508,592 | 4/1985 | Kowalski . |
| 4,554,806 | 11/1985 | Hewins ........................ 100/121 X |
| 4,555,987 | 12/1985 | Tomlinson .................... 100/37 X |
| 4,691,629 | 9/1987 | Koba ............................... 100/176 |

FOREIGN PATENT DOCUMENTS

| | | |
|---|---|---|
| 2241402 | 3/1975 | France . |
| 3122601 | 12/1982 | Fed. Rep. of Germany . |
| 7168 | of 1915 | United Kingdom . |
| 115203 | 4/1918 | United Kingdom . |
| 137569 | 1/1920 | United Kingdom . |
| 160169 | 3/1922 | United Kingdom . |
| 383062 | 11/1932 | United Kingdom . |
| 1392287 | 4/1975 | United Kingdom . |
| 2017519 | 10/1979 | United Kingdom ............... 100/37 |

*Primary Examiner*—Andrew M. Falik

[57] ABSTRACT

A method for agglomerating and dewatering elastomeric material having a relatively high water content wherein the elastomeric material is fed to a pair of counterrotating pressing rolls with a tight nip opening. The elastomeric material is drawn through the nip opening and compacted and dewatered therein. The method of the present invention produces at least a doubling of the particle size of the feed material and a reduction in the water content of the feed material in the range of 30 to 80%.

31 Claims, 4 Drawing Sheets

METHOD OF AGGLOMERATING AND DEWATERING POLYMERIC MATERIALS

BACKGROUND OF THE INVENTION

1. Field of the Invention

The present invention relates to a method for agglomerating and dewatering polymeric materials and, in particular, elastomeric materials, as part of the overall drying process which occurs subsequent to polymerization. More specifically, the invention pertains to a method wherein elastomeric material having a relatively high water content, approximately 35 to 60%, is fed into the tight nip opening formed by a pair of counterrotating pressing rolls in a rubber crumb compactor apparatus and is agglomerated and dewatered therein. The elastomeric feed is presented to the compactor apparatus in the form of discrete fines and particles or as continuous sheets. The agglomerated product produced by the compactor apparatus from discrete fines and small particle feed is in the form of compacted, larger-sized particulates and, in the case of large particle or sheet feed, is in the form of continuous sheets. The water content of the feed material is reduced to around 10 to 30% by the rubber cumb compactor apparatus with a relative reduction in water content in the range of 30 to 80%.

In the production of synthetic elastomeric materials, such as butyl rubber, chlorinated butyl rubber, brominated butyl rubber, EPDM elastomers SBR, BR, etc., and the like, the product obtained from the polymerization process is in the form of an aqueous slurry. To finish the product, rubber particles which are essentially moisture free are prepared by a series of conventional drying steps.

A typical drying process first employs a vacuum drum, or vibrating or fixed screen, which receives the initial slurry containing only about 3 to 5 wt. % rubber, the balance of the weight being water. There is no significant particle size increase on the screens or in the vacuum drum and the rubber crumb which is produced thereby contains 35 to 60% by weight water. Further drying is then achieved by treating the material in a first dewatering extruder. This step typically provides rubber crumb particles containing from about 5% to 16% by weight water. The capacity of the first dewatering extruder is profoundly affected by crumb size and feed water content. More particularly, the capacity of the dewatering extruder is reduced dramatically with small feed crumb size and/or high feed water content.

It has been found, for instance, that expellers one particular type of dewatering extruder, encounter problems handling certain types of elastomeric grades. If the elastomer is such that it extrudes very easily, it is often difficult to input the work necessary to dewater the rubber. Additionally, the expeller drainage slots, formed by barrel bars, often plug with rubber and, due to low pressure in the expeller, the machine is unable to push the plugs out of the way to allow water to excape. Consequently, rubber rates are severely limited and the elastomeric material discharged often has an unacceptably high moisture content, around 15 to 17%. If the feed rate is increased in an effort to increase pressure in the expeller, the expeller barrel then fills with feed material and the material backs into the expeller hopper, causing the expeller to plug. The foregoing deficiencies and emphasized in cases of small feed crumb size, and-/or high feed moisture content, resulting in unstable extrusion operation.

Thus, the need exists for a method to press free water from the inlet crumb and to form larger crumb by agglomerating small crumb upstream of the expeller. Expeller line rates and extruder plugging would then be improved and the feed section and pressing sections of the expeller would then be unloaded.

The subject method of dewatering and agglomerating polymeric materials utilizes a rubber crumb compactor apparatus having counterrotating rolls with a tight nip opening to compact the feed rubber crumb prior to the step of feeding the rubber cumb to the first dewatering extruder, to agglomerate the crumb into larger pieces or continuous mats, and to reduce the water content of the feed crumb to approximately 10 to 30% by weight water. Thus, the relative reduction in water content of the rubber crumb prior to being fed to the first dewatering extruder is in the range of a 30 to 80% reduction.

The method of the present invention greatly enhances the capacity of the first dewatering extruder. Indeed, in some instances, the first dewatering extruder can be replaced with the instant process and eliminated entirely. Furthermore, the effective dewatering achieved by compaction according to the present process, which utilizes principles of simple compression and simple shear, results in lower energy requirements than for a dewatering extruder, which transfers mechanical work into the rubber mass by the less efficient viscous shear mechanism.

Hence, the present invention achieves more efficient primary dewatering in a rubber emulsion process in a single squeezing step within a very short period of time. The invention results in agglomeration of the inlet crumb, regardless of size, with a minimum of doubling of the average particle size and, in most cases, easily forming continuous mats. The process results in a significant increase in the dewatering capacity of the first dewatering extruder by mitigating the limitations caused by small feed crumb particles and high moisture content. Moreover, the process allows for an increase in the capacity of the overall rubber dewatering-drying extruder process by decreasing the feed moisture content by a relative reduction of 30 to 80% by current methods. The compactor of the instant method may even replace the first dewatering extruder or the vacuum drum in some finishing operation scenarios due to its superior dewatering and agglomerating capability and lower horsepower requirements.

The instant method can be utilized in any rubber slurry or emulsion drying or devolatilizing process in which water or a non-solvent must be removed from the rubber particles. The invention is particularly effective in improving the operation of a dewatering extruder or similar mechanical device when the water or the non-solvent in the feed is greater than 15% weight water. The invention is able to augment or to replace the existing dewatering extruder or similar mechanical device based on its more effective performance and lower energy requirements.

2. Description of the Prior Art

As discussed previously herein, the conventional finishing process for water slurries of solid elastomers involves, in part, fixed or vibrating screens or vacuum drums prior to treating the material in a dewatering extruder. Representative disclosures of methods for removing moisture from elastomers are disclosed in U.S. Pat. No. 3,222,797, issued Dec. 14, 1965 to Zies; U.S. Pat. No. 3,240,746, issued Mar. 15, 1966 to Davis; and U.S. Pat. No. 4,508,592, issued Apr. 2, 1985 to Kowalski.

U.S. Pat. No. 3,222,797 is directed to a method for preliminary dewatering and finish drying of a variety of polymers, including elastomers, in an extruder device. The process involves transferring the polymer through an extruder so that both temperature and pressure are progressively increased.

U.S. Pat. No. 3,240,746 describes a process for removing water from solid elastomers wherein the elastomer crumb is supplied to a shaker screen and thence to a water expeller or screw press.

U.S. Pat. No. 4,508,592 teaches an elastomer extrusion drying process characterized by injecting gas into the compression zone of an extruder to provide improved efficiency in the explosion drying process.

A method for mechanically removing physically combined water from solid polymers is disclosed in U.S. Pat. No. 2,771,689, issued Nov. 27, 1956 to Bettes, Jr. The method comprises feeding a water saturated polymer into the nip of a press including a pair of parallel metal rollers. One roll is maintained cool and the other is maintained hot such that, when the rolls are counterrotated, the substantially water free polymer adheres to the hot roll and the water collects on the cool roll. The polymer is scraped from the surface of the hot roll and deposited on a conveyor by means of a blade, while water is removed from the cool roll by a wiper blade. The process and means for practicing the process are relatively complex and require extraneous steps, such as scraping the roll surfaces and the belt upon which the polymer is deposited.

None of the prior art methods for dewatering and drying polymeric materials teaches or suggests a simple and effective method for agglomerating and dewatering elastomeric materials which is capable of accommodating a variety of processing conditions and achieving significant compaction and dewatering results.

Various methods and devices are known in the prior art for removing a liquid phase from various solids. For example, U.S. Pat. No. 2,798,424 issued July 9, 1957 to Smith et al discloses a filter for dewatering sewage sludge comprising a wire screen in the form of a fluted cylinder which meshes with a similarly configured fluted drum. The two members are rotated in unison and partially dewatered sludge is picked up in the pockets between the fluted surfaces. The sludge is progressively fed along between the surfaces with increasing pressure, thereby causing the water to be progressively removed through the screen. The solids form a cake or layer on the surface of the screen and are stripped therefrom by means of a stripping wire.

Similarly, U.S. Pat. No. 3,527,668, issued Sept. 8, 1970 to Kusters et al teaches an apparatus for removing water from cellulose webs by means of rolls contacting each other under pressure and between which the material passes. The roll peripheries are corrugated such that the rolls carry along the cellulose breadth and compress it therebetween.

A like device is shown in U.S. Pat. No. 4,475,453, issued Oct. 9, 1984 to Davis. The patent is directed to a method and apparatus for expressing the liquid phase from a wet mixture, such as a clay-like mixture. The apparatus disclosed includes a primary roll and a plurality of smaller pressure rolls having a thick outer covering of a deformable elastomeric material. A pair of opposed filter belts are trained about the primary roll for feeding the wet mixture through the nips formed between the primary and pressure rolls.

The prior art also discloses means for cutting diverse materials by feeding the material to be cut to a pair of rotating cutting members. Representative disclosures of devices of this type are shown in U.S. Pat. No. 3,529,777, issued Sept. 22, 1970 to Dodson et al and U.S. Pat. No. 4,374,573, issued Feb. 22, 1983 to Rouse et al.

U.S. Pat. No. 3,529,777 is directed to a process for granulating sheet-like material wherein the material to be granulated is fed into the bite of intermeshing teeth of a pair of rotating cutter members.

U.S. Pat. No. 4,374,573 discloses an apparatus for shredding waste material, such as rubber tires. The material to be shredded is fed to a pair of intermeshed cylindrical cutter rolls having a plurality of cutter discs.

It is also known in the prior art to utilize rotating rolls for crushing various substances. For instance, U.S. Pat. No. 1,691,546, issued Nov. 13, 1928 to Farrel, Jr., relates to a cane grinding apparatus comprising a pair of rotating toothed rolls which hook and draw in the cane so as to crush the cane and split open the stalks and separate the fibers.

U.S. Pat. No. 4,396,158, issued Aug. 2, 1983 to Olsen, discloses a device and method for processing hatchery offal by crushing or smashing it as it is passed between a pair of counterrotating rollers. The outer peripheries of the respective rollers are provided with a plurality of corrugations which mesh with, but do not contact, each other.

Similarly, U.S. Pat. No. 4,410,144, issued Oct. 18, 1983 to Imperi, is directed to a counterrotated crusher roll system wherein material to be crushed is fed into the nip between the teeth of a pair of power driven counterrotating rolls to be crushed into relatively fine particles. The teeth, which are formed on the exterior of the respective rolls, carry the material to be crushed downwardly through the nip and crush the material therein.

The aforementioned prior art fails to disclose a method of agglomerating and dewatering elastomers utilizing counterrotating pressing rolls capable of variable roll clearances and variable speed operation and being specifically adapted to process a material of the sort which undergoes continuous deformation.

SUMMARY OF THE INVENTION

The present invention is directed to a method for agglomerating and dewatering polymeric materials and, in particular, elastomeric materials. The method utilizes a rubber crumb compactor apparatus to which is fed an elastomeric material in the form of discrete particles or a continuous sheet and containing 35 to 60% water by weight. The rubber crumb compactor apparatus comprises a frame within which is mounted a pair of pressing rolls. A specific gap, or clearance, is maintained between the pressing rolls of means of a pair of adjustment devices mounted on the frame, resulting in a tight nip opening between the pressing rolls. The pressing rolls are driven in counterrotation by an arrangement which allows both rolls to be driven maintaining relative orientation of the roll surfaces. The pressing rolls may assume a variety of geometrical forms, including smooth roll surface, lobed roll surface or toothed roll surface. The lobed and toothed roll surfaces may be oriented longitudinally or helically upon the pressing rolls. The clearance between the pressing rolls in the compactor apparatus may be varied simply by manual or automatic adjustment of the roll positioning devices. Moreover, the speed of rotation for the pressing rolls may be continuously varied by changing the motor speed.

The method of the present invention involves presenting the elastomeric feed material to the counterrotating pressing rolls where it is drawn into the tight nip opening formed by the rolls. The feed material is agglomerated and compacted therein by the action of the pressing rolls with the particle size of the feed material being, at a minimum, doubled, and in many cases, being formed into continuous sheets. Action of the pressing rolls squeezes the liquid out of the elastomeric feed, resulting in a product having a water content of 10 to 30%.

The liquid which is removed from the feed material is able to effectively drain from the pressing rolls through the unrestricted opening following the tight nip and through a series of smooth channel formed in the surface of the pressing rolls. The agglomerated and dewatered elastomeric material passes out of the compactor apparatus and is fed, if necessary, to a dewatering extruder for further drying.

The invention will be better understood with reference to the following description, taken in conjunction with the accompanying drawings.

DESCRIPTION OF THE PREFERRED EMBODIMENT

The method of the present invention is practiced in accordance with a rubber crumb compactor apparatus which agglomerates and dewaters polymeric materials, specifically elastomeric materials. A preferred embodiment of the compactor will be described with reference to FIGS. 1, 2 and 3.

Figure 1:
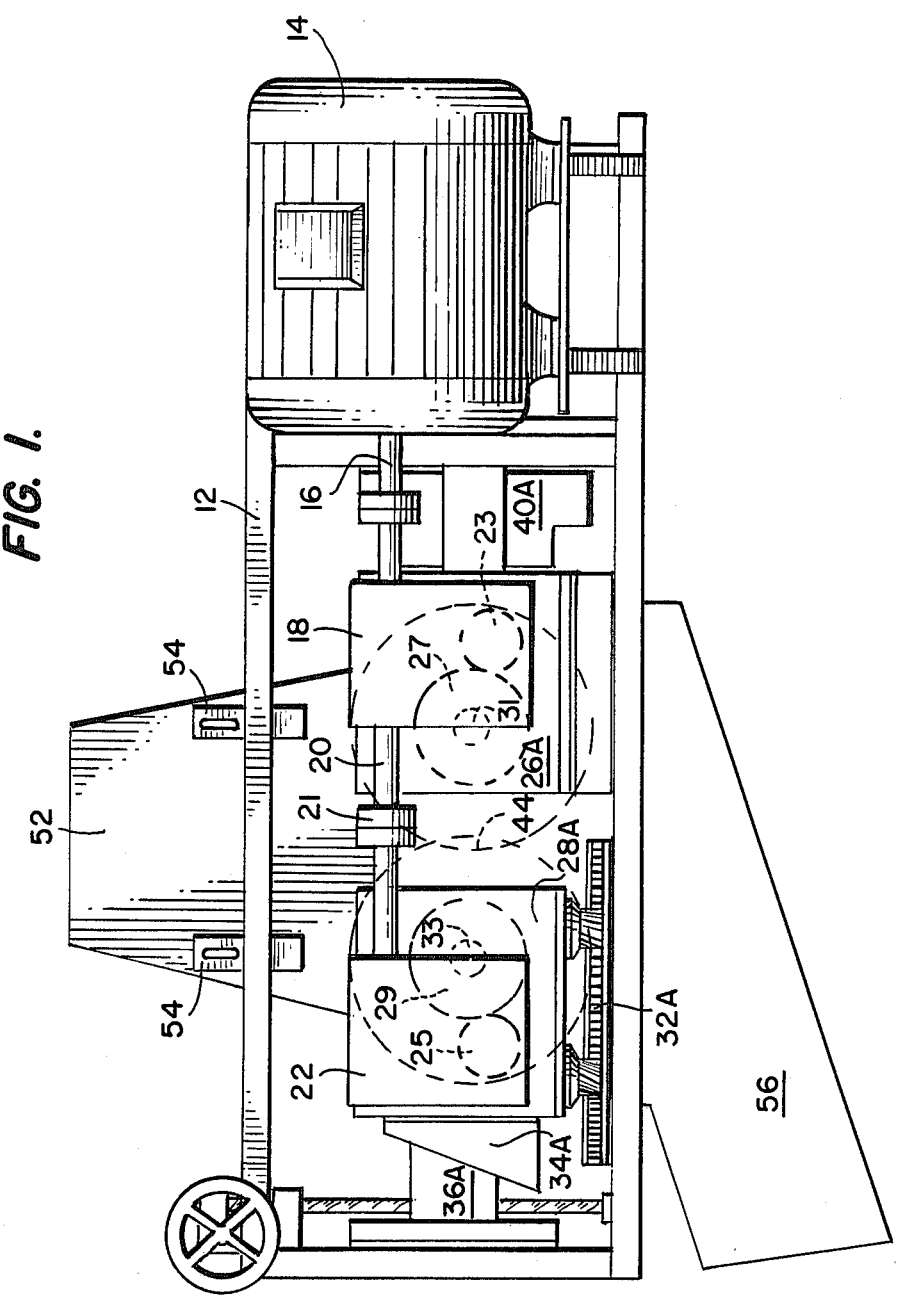
FIG. 1 is a drive side elevational view of the rubber crumb compactor apparatus which is capable of practicing the method of the present invention.
Figure 2:
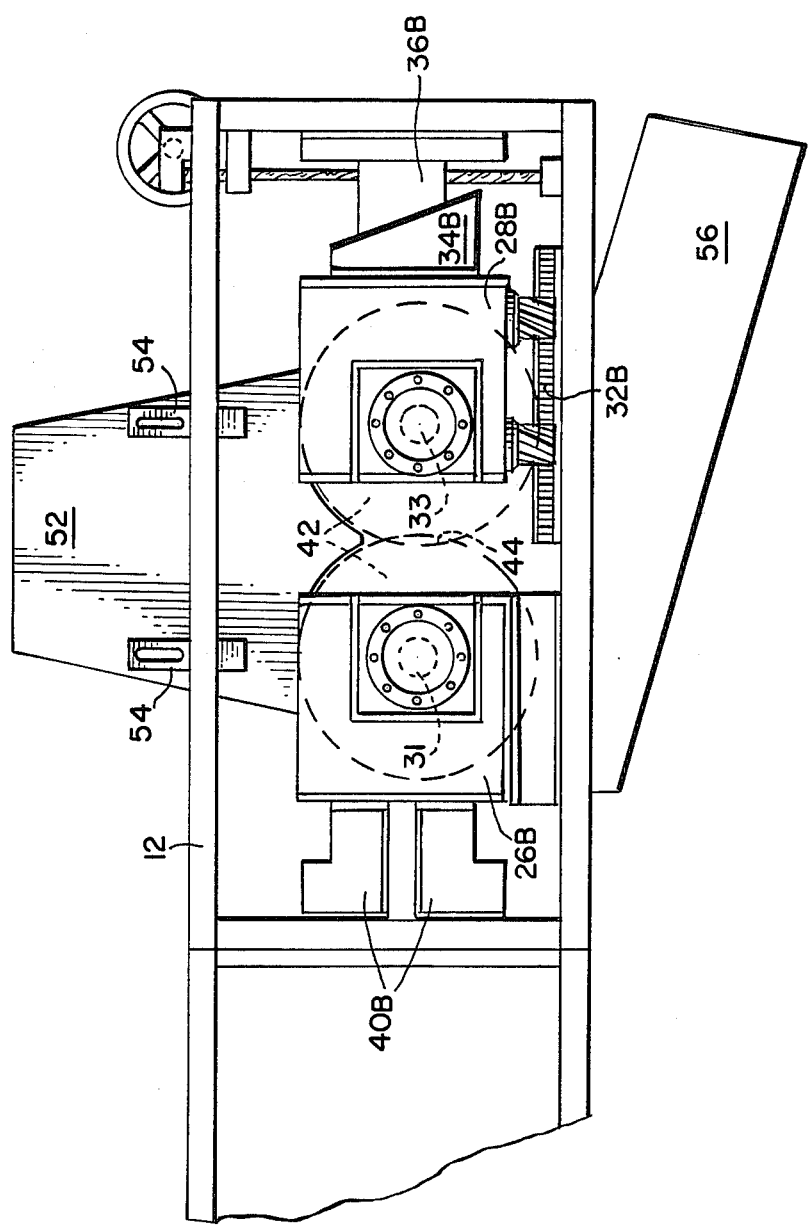
FIG. 2 is an idle side elevational view of the rubber crumb compactor apparatus.
Figure 3:
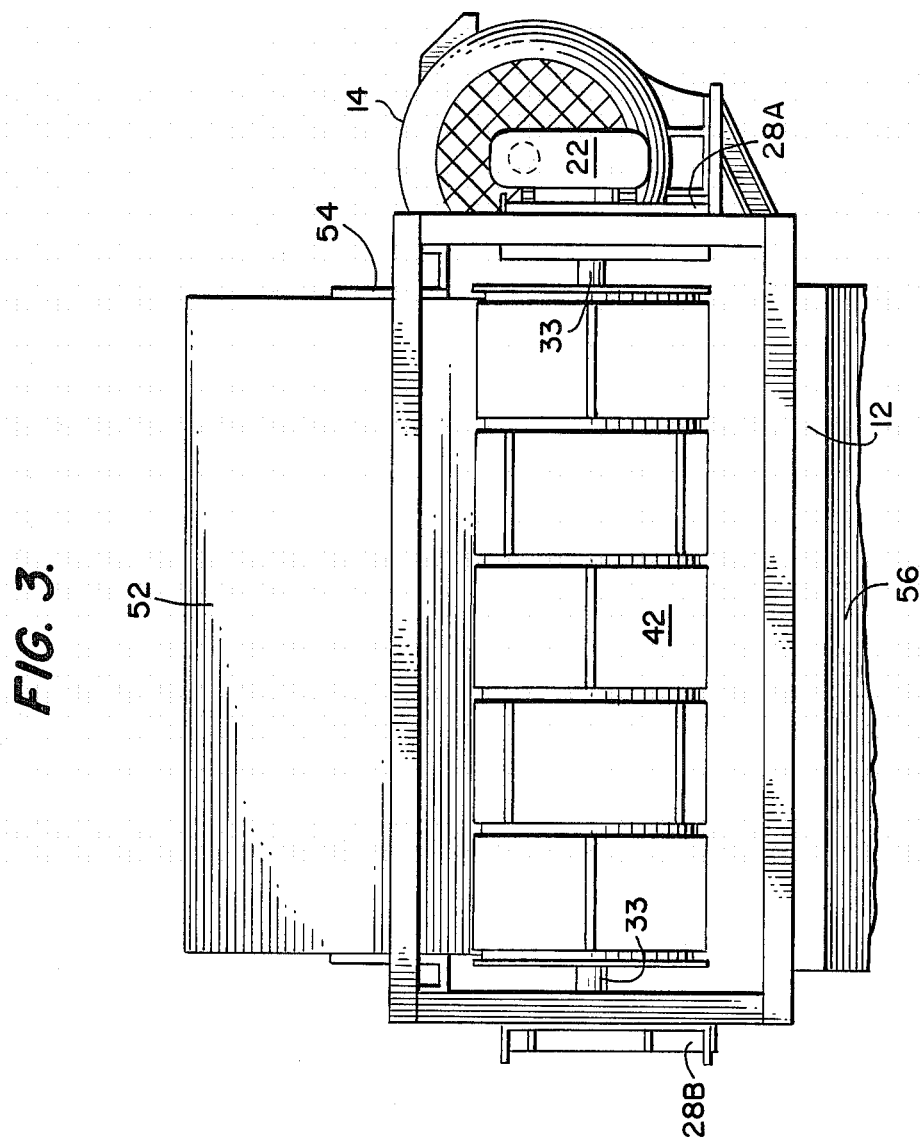
FIG. 3 is a front elevational view of the rubber crumb compactor apparatus.

With particular reference to FIGS. 1 and 2, the rubber crumb compactor apparatus, indicated generally at 10, comprises a generally rectangular, box-like frame 12 upon which is mounted drive motor 14, which is preferably 30 horsepower with variable speed capability. More shaft 16 drives first right angle reduction gear box 18, which preferably has a reduction ratio of 15:1, at a speed of 1800 maximum RPM. The first output shaft of the first right angle reduction gear box 18 drives a second right angle reduction gear box 22. This second right angle reduction gear box has the same reduction ratio as the first right angle reduction gear box 18, that being 15:1. The two right angle reduction gear boxes 18,22 differ only in the rotational orientation of the perpendicular output shaft. The output of each right angle gear box 18,22 drives a pinion gear 23,25, respectively, located in gear boxes 26A,28A which also support the right angle gear boxes 18,22. Each pinion gear 23,25 drives a spur gear 27,29 which is fit on the roll shaft 31,33. The gear ratio of these gear boxes 26A,28A is 2.8:1. Orientation of all drive components is such that the pressing rolls are counterrotating with a maximum roll speed of 43 RPM.

One gear box 26A is bolted to the frame 12 and supported at 40A such that thrust loading is transmitted to the frame 12. The other gear box 28A rests on a linear bearing 32A which allows it to be moved to adjust the clearance between the rolls. The extension of the drive shaft 20, connecting the two right angle gear boxes 18,22, is accomplished through the use of a splined coupling 21.

On the opposite side of the machine the pressing roll shafts 31,33 rest in bearings located in bearing housings 26B and 28B. One bearing housing 26B is stationary, being bolted to the frame 12 and supported at 40B such that thrust loading is transmitted to the frame 12. The other bearing housing 28B is mounted on a linear bearing 32B to allow movement of the bearing housing 28B for roll clearance adjustment. Two sets of adjustment wedges 34A, 36A and 34B,36B are used to position the movable roll relative to the stationary roll, and transmit thrust loading to the frame 12. One set of adjustment wedges 34A,36A positions the movable gear box 28A on the driven side of the machine. The other set of wedges 34B,36B positions the bearing housing 28B on the idle side of the machine. In accordance with the preferred embodiment of this machine the clearance 44 between the pressing rolls is to be variable between 0.5 and 10 millimeters. Maximum attainable clearance is dependent on minimum required engagement length for the splined coupling 21.

The roll shafts 31,33 are supported in the idle side bearing housings 26B,28B and the bearing blocks built into the rear of the drive side gear boxes 26A,28A. They are attached to the roll assembly such that shaft and roll turn at the same speed. As stated previously, albeit indirectly, the subject rubber crumb compactor possesses variable speed capability for accommodating a variety of processing conditions. The variable speed capability of the rubber crumb compactor is to be utilized for accepting diverse elastomer feeds and rates. The variable speed attribute is realized in that the motor speed can be varied from its maximum specified speed of 1800 RPM by virtue of it being either a DC motor or an AC motor, fitted with a variable speed controller. Roll speed of the compactor will vary between 10 and 43 RPM.

One of a pair of smooth cylindrical pressing rolls 42 is mounted on the stationary pressing roll shaft 31 interiorly of the frame. The other pressing roll 42 is mounted on a similar, movable pressing roll shaft 33 which is disposed parallel to and spaced from the first pressing roll shaft so as to form a clearance 44 between the pressing rolls 42, as seen in FIG. 1. The pressing rolls are each in the form of a cylindrical sleeve, preferably made of stainless steel, which fits over the respective pressing roll shafts 31,33, which are, desirably, formed of a high strength steel alloy. The pressing rolls are removably mounted on the pressing roll shafts so that they may be removed from the shafts and replaced with similar pressing rolls, or with pressing rolls of diverse geometries, as will hereinafter be discussed. The diameter of the pressing rolls is a key variable in determining the compaction ratio of the elastomeric feed achieved in the compactor, with higher compaction ratios typically being realized with larger diameter pressing rolls.

A removable feed hopper 52 is mounted on frame 12 directly above the clearance 44 formed by the pair of pressing rolls 42. The feed hopper is removably secured in position on the frame by means of a plurality of hopper locks 54. The feed hopper is thus removable for easy cleaning.

A discharge hopper 56 is mounted within the frame directly below the pair of pressing rolls 42. The discharge hopper is downwardly inclined towards either side of the frame depending on installation requirements. The discharge hopper is thus adapted to receive the agglomerated and dewatered elastomeric material which passes through the clearance formed between the pressing rolls, allowing it to fall downwardly by gravity out from the frame. As seen in the drawings the dewatered material is discharged from the both of the pressing rolls only by gravity without the use of conventional devices such as doctor blades.

Figure 4:
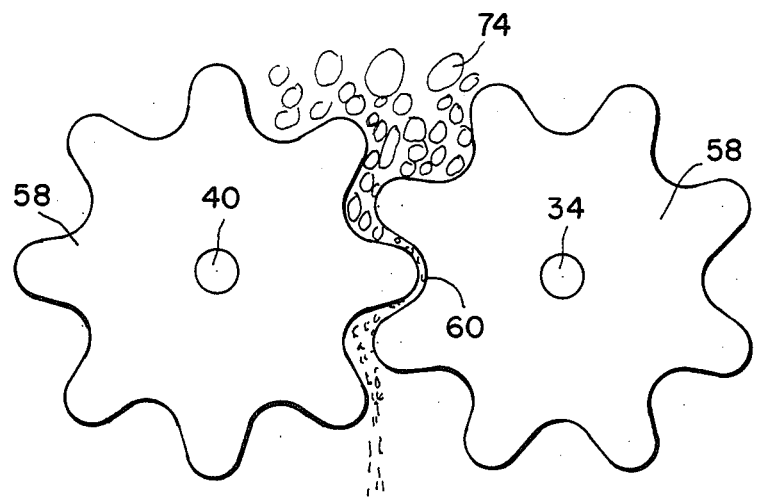
FIG. 4 depicts a preferred embodiment for the geometry of the pressing rolls of the rubber crumb compactor apparatus.

While FIGS. 1 and 2 depict the pressing rolls 42 as being non-intermeshing smooth cylindrical sleeves, the preferred embodiment of the invention contemplates the pressing rolls as being, alternatively, intermeshing round lobed cylindrical sleeves 58, as illustrated in FIG. 4. The round lobed cylindrical sleeves 58 are intermeshing, with the clearance 60 between the sleeve rolls being 0.5 to 10 mm, so as to form a tight nip opening between the pressing rolls. This clearance can be varied as previously discussed in connection with the smooth cylindrical sleeves 36 of FIGS. 1 and 2.

Figure 5:
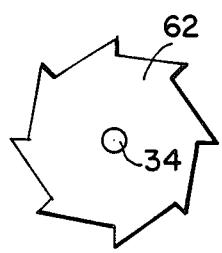
FIG. 5 depicts an alternative embodiment for the geometry of the pressing rolls of the rubber crumb compactor apparatus.
Figure 6:
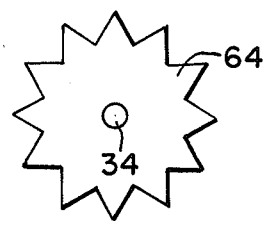
FIG. 6 depicts a second alternative embodiment for the geometry of the pressing rolls of the rubber crumb compactor apparatus.
Figure 7:
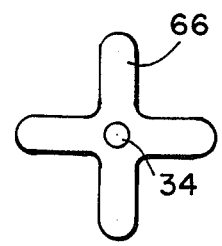
FIG. 7 depicts a third alternative embodiment for the geometry of the pressing rolls of the rubber crumb compactor apparatus.

In addition to the smooth roll and lobed roll sleeves of FIGS. 1, 2, 3 and 4, the sleeves may be formed in accordance with the configurations depicted in FIGS. 5-7. FIG. 5 depicts a sleeve 62 formed with rip teeth adapted to intermesh with a like, but oppositely facing, rip tooth sleeve (not shown). FIG. 6 shows a sleeve 64 which is of a star tooth configuration and which is adapted to intermesh with a like star toothed sleeve (not shown). FIG. 7 depicts a large lobed sleeve 66 which is adapted to intermesh with a similarly configured large lobe sleeve (not shown).

While the pressing rolls 47 of FIGS. 1 and 2 are characterized by a smooth mill surface and are non-intermeshing, the embodiments of FIGS. 4-7 are directed to pressing rolls having diverse gear-type geometries which form an intermeshing pair. As previously discussed, the gap between the pressing rolls, regardless of type, is variable, with a tight nip opening of the pressing rolls being maintained.

Figure 8:
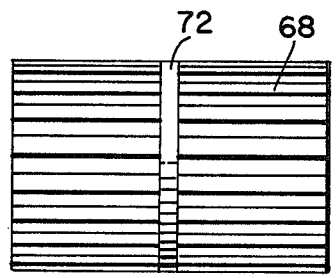
FIG. 8 depicts a longitudinal layout for a pressing roll.
Figure 9:
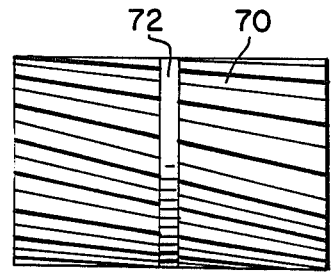
FIG. 9 depicts a helical layout for a pressing roll.

A further characteristic of the gear-type geometries of FIGS. 4-7 is that the lobes or teeth may be formed longitudinally or helically. FIG. 8 illustrates the layout for a pressing roll 68 wherein the lobes or teeth are disposed longitudinally along the length of the roll. FIG. 9 depicts the layout for a pressing roll 70 wherein the lobes or teeth are helically disposed along the longitudinal dimension thereof.

As is further shown in FIGS. 8 and 9, the cylindrical pressing rolls are provided with at least one smooth groove 72, or slot, formed in the circumference of the sleeve transverse to the longitudinal length thereof. The smooth groove, which is shown in FIGS. 8 and 9 as being formed toward the center of the sleeve, serves the purpose of providing an outlet for the drainage of the water which is squeezed from the elastomeric feed material, and serves to separate compacted and dewatered product into discrete pieces. A particular installation will require a given product form and maximum size, thereby setting a minimum number of circumferential grooves. Sizing of these grooves is dependent on the amount of water expressed from the elastomer.

In operation, the rubber crumb compactor apparatus is to be preferably mounted over a vibrating or fixed screen, which in turn feeds the first dewatering extruder, or fed directly to the first dewatering extruder. A slurry of elastomeric feed material is fed to the feed hopper of the rubber crumb compactor apparatus across a fixed screen. The elastomeric material fed to the feed hopper may be in discrete particle form or in the form of a continuous sheet. The elastomeric feed material provided to the compactor will normally contain 30% to 60% water by weight. The elastomeric feed material descends through the feed hopper and is presented to the tight nip opening of the counterrotating pressing rolls.

With reference to FIG. 4, the elastomeric feed 74 is drawn into the tight nip opening and is agglomerated by action of the counterrotating pressing rolls. Particulate feed crumb of elastomeric material is compacted and agglomerated into larger particles. Particulate feed and/or continuous sheet feed of elastomeric material may be agglomerated so as to produce larger, discrete size particles or compacted continuous sheets. As a minimum, a doubling of the average particle size is achieved and, in most cases, continuous mats are easily formed. The volume reduction between the compactor feed opening and the nip provides a most efficient compaction method, as compared to the screw-die arrangement associated with a typical dewatering extruder. For example, the maximum achievable compaction ratio of a 200 mm compactor with a 2 mm nip opening is 20, while the typical compaction ratio for a screw extruder is limited to 2 to 5. Even higher compaction ratios can be realized with the compactor, for a given feed, simply by increasing the diameter of the pressing rolls. This dramatically high compaction ratio is possible due to the efficient operation of the compactor in agglomerating and dewatering. Consequently, the dewatering capacity of the first dewatering extruder is increased by removing the limitations attributed to small feed crumb particles, and large volumes of occluded water.

As the elastomeric feed enters the feed opening of the counterrotating pressing rolls and passes through the tight nip, it is substantially and effectively dewatered. Indeed, the water content of the elastomeric material is significantly reduced, from 30 to 60%, to roughly 10 to 30%, with a relative reduction in the range of 30 to 80%. The rubber crumb compactor apparatus is able to achieve efficient dewatering in a single squeezing step within a very short period of time. Moreover, the immediate opening of the pressing rolls after the tight nip provides area for water drainage and eliminates the typical water logging problems associated with conventional dewatering extruders. Removing the expressed water during compaction reduces the moisture content of the elastomeric material for subsequent feed to the first dewatering extruder. This feature results in a reduction of the work which must be done by the first dewatering extruder. As a result, in the case of an open barrel dewatering extruder, the barrel bars may be further closed so as to reduce side extrusion and the overall capacity of the first dewatering extruder can be increased. Indeed, the rubber crumb compactor apparatus may, in some instances, replace the first dewatering extruder if it can match or exceed the performance of the extruder. The method of agglomerating and dewatering elastomeric materials of the present invention will now be described with reference to the following examples, which are not considered as limitative of its scope.

EXAMPLE 1

The dewatering performance of the rubber crumb compactor demonstrated in a cold mill having 5 inch diameter smooth pressing rolls 11 inches in length, which was run at 30 RPM and provided with a feed of wet chlorobutyl rubber crumb achieved the following results:

| Nip Opening (mm) or inches | Rubber Rate (lb/hr) | Relative Reduction in Occluded $H_2O$ % (1) | Product Form |
| --- | --- | --- | --- |
| 1.0 | 0.038 | 486 | 33 | Mat |
| 1.0 | 0.038 | 564 | 30 | Mat |
| 1.6 | 0.062 | 781 | 27 | Loose Mat |

EXAMPLE 2

A rubber crumb compactor apparatus with intermeshing lobed pressing rolls demonstrated similar dewatering characteristics with other types of rubber. Results for a rubber compactor apparatus run with 120 mm diameter lobed pressing rolls with a feed of ethylene-propylene rubber are as follows:

| | Rubber | Nip Opening (mm) | RPM | Rubber Rate (kg/hr) | Relative Reduction in Occluded $H_2O$ % (1) | Product Form |
| --- | --- | --- | --- | --- | --- | --- |
| Prototype I | EP-1 | 1.5 | 20 | 190 | 23 | Noncontinuous Mat |
| | EP-1 | 3.7 | 42 | 500 | 23 | |

EXAMPLE 3

A rubber crumb compactor apparatus with intermeshing lobed pressing rolls of 200 mm diameter demonstrated the following results when fed a second grade of ethylene-propylene rubber and a butyl rubber:

| | Rubber | Nip Opening (mm) | RPM | Rubber Rate (kg/hr) | Relative Reduction in Occluded $H_2O$ % (1) | Product Form |
| --- | --- | --- | --- | --- | --- | --- |
| Prototype II | EP-2 | <0.2 | 20 | 200 | 50 | Continuous Mat |
| | Butyl | 4.0 | | | 50 | |

Examples 2 and 3 show that the lobe geometry utilized on the pressing rolls greatly improves the feeding of wet crumb, providing positive displacement type pumping capability. The lobe geometries depicted in FIGS. 4-6, such as rip teeth, star teeth, and deep lobe, as well as the longitudinal and helical layouts of FIGS. 7 and 8, are all effective in performing the agglomerating and dewatering functions, as well as providing positive feed flow.

The smooth lobed pressing roll surfaces, as depicted in the preferred embodiment of FIG. 4, do not mechanically induce a tearing type shear in the elastomeric material. Rather, the principles by which the polymer and water phases are separated in the rubber crumb compactor apparatus consist of simple compression and simple shear. The simple shear is a result of the feeding characteristics of the lobed pressing roll surface geometry and the fluid nature of the elastomeric feed. More rubber and water are captured by the pressing rolls than would normally flow through the minimum pressing roll clearance at the speed of the pressing roll surfaces. This characteristic induces an average flow velocity of the elastomeric feed which is substantially higher than the pressing roll surface velocity, thereby resulting in simple shear.

Various modifications of the instant invention may become apparent to those skilled in the art without departing from the scope and spirit of the invention as described herein in connection with the preferred embodiments. Hence, the preferred embodiment discussed herein are illustrative and should not be construed to limit the invention as defined by the appended claims.

What is claimed is:

1. A method of agglomerating and dewatering a solid polymeric material containing liquid comprising the steps of presenting said material to a single pair of pressing rolls, said pressing rolls being non-deformable, said pressing rolls having a preselected fixed nip opening, and driving said pressing rolls in counterrotation at a preselected speed, said pressing rolls being adapted to draw said polymeric material into said nip opening, to compact said polymeric material, and to dewater said polymeric material in a single squeezing step, whereby the liquid content of said polymeric material is reduced by about 30 to 80%, said compacted and dewatered material along with the expressed liquid therefrom being discharged from the bottom of said pressing rolls only by gravity.

2. The method of agglomerating and dewatering as recited in claim 1 wherein the size of said nip opening is in the range of 0.5 to 10 mm.

3. The method of agglomerating and dewatering as recited in claim 1 wherein said polymeric material presented to said pressing rolls includes particles, said particles being compacted by means of said pressing rolls to form continuous sheets of said material.

4. The method of agglomerating and dewatering as recited in claim 1 wherein the liquid content of the polymeric material presented to said pressing rolls is in the range of 30 to 60%.

5. The method of agglomerating and dewatering as recited in claim 1 wherein the liquid content of the compacted and dewatered polymeric material is in the range of 10 to 30%.

6. The method of agglomerating and dewatering as recited in claim 1 wherein said pressing rolls have a smooth surface.

7. The method of agglomerating and dewatering as recited in claim 1 wherein said pressing rolls have an intermeshing gear-type surface.

8. The method of agglomerating and dewatering as recited in claim 7 wherein said gear-type surface is oriented longitudinally on said pressing rolls.

9. The method of agglomerating and dewatering as recited in claim 7 wherein said gear-type surface is oriented helically on said pressing rolls.

10. The method of agglomerating and dewatering as recited in claim 7 wherein said gear-type surface is a lobed surface.

11. The method of agglomerating and dewatering as recited in claim 7 wherein said gear-type surface is a toothed surface.

12. A method of agglomerating and dewatering solid polymeric material containing liquid comprising the steps of presenting said polymeric material to a single pair of pressing rolls, said pressing rolls being non-deformable and being formed of a sleeve of stainless steel, said pressing rolls having a preselected fixed nip opening in the range of 0.5 to 10 MM, and driving said pressing rolls in counterrotation at a preselected speed, said pressing rolls being adapted to draw said polymeric material into said nip opening, to compact said polymeric material and to dewater said polymeric material in a single squeezing step whereby the liquid content of said polymeric material is reduced by about 30 to 80%, said compacted and dewatered material along with the expressed liquid therefrom being discharged from the bottom of said pressing rolls only by gravity.

13. The method of agglomerating and dewatering as recited in claim 12 wherein said polymeric material presented to said pair of pressing rolls includes particles having a certain size, said particles being compacted by means of said pressing rolls whereby said size of said particles is, at a minimum, doubled.

14. The method of agglomerating and dewatering as recited in claim 12 wherein said polymeric material presented to said pressing rolls is compacted such that said material is in the form of a continuous sheet.

15. The method of agglomerating and dewatering as recited in claim 12 wherein said pressing rolls have a smooth surface.

16. The method of agglomerating and dewatering as recited in claim 12 wherein said pressing rolls have an intermeshing gear-type surface.

17. The method of agglomerating and dewatering as recited in claim 16 wherein said gear-type surface is oriented longitudinally on said pressing rolls.

18. The method of agglomerating and dewatering as recited in claim 16 wherein said gear-type surface is oriented helically on said pressing rolls.

19. The method of agglomerating and dewatering as recited in claim 16 wherein said gear-type surface is a lobed surface.

20. The method of agglomerating and dewatering as recited in claim 16 wherein said gear-type surface is a toothed surface.

21. A method of agglomerating and dewatering solid polymeric material containing liquid, as utilized in conjunction with a rubber crumb compactor apparatus comprising a frame, at least a first pair of non-deformable pressing rolls mounted in said frame, each of said pairs of pressing rolls forming a tight fixed nip opening, setting means for setting said nip opening between said pressing rolls, driving means provided on said frame for driving each of said pairs of pressing rolls in counterrotation at a predetermined fixed speed and presenting means for feeding polymeric material to said first pair of pressing rolls, the method comprising the steps of:
(a) setting said nip opening between said first pair of said pressing rolls by means of said setting means to a preselected size;
(b) driving said first pair of pressing rolls in counter-rotation by means of said driving means at a predetermined speed;
(c) feeding said polymeric material to said nip opening of said first pair of pressing rolls by means of said presenting means, said first pair of pressing rolls being adapted to draw said polymeric material into said nip opening between said first pair of pressing rolls, to compact said polymeric material, and to dewater said polymeric material by means of said first pair of pressing rolls in a single squeezing step, whereby the liquid content of said polymeric material is reduced by about 30 to 80%; and
(d) discharging said compacted and dewatered material along with the expressed liquid therefrom only by gravity from the bottom of said first pair of pressing rolls.

22. The method of agglomerating and dewatering as recited in claim 21 wherein the size of said nip openings is in the range of 0.5 to 10 mm.

23. The method of agglomerating and dewatering as recited in claim 20 wherein the liquid content of the material compacted and dewatered by said first pair of pressing rolls is in the range of 10 to 30%.

24. The method of agglomerating and dewatering as recited in claim 21 wherein said pressing rolls have a smooth surface.

25. The method of agglomerating and dewatering as recited in claim 21 wherein said pressing rolls have an intermeshing gear-type surface.

26. The method of agglomerating and dewatering as recited in claim 25 wherein said gear-type surface is oriented longitudinally on said pressing rolls.

27. The method of agglomerating and dewatering as recited in claim 25 wherein said gear-type surface is oriented helically on said pressing rolls.

28. The method of agglomerating and dewatering as recited in claim 25 wherein said gear-type surface is a lobed surface.

29. The method of agglomerating and dewatering as recited in claim 25 wherein said gear-type surface is a toothed surface.

30. The method of agglomerating and dewatering as recited in claims 1, 12 or 21 wherein the size of said nip opening can be varied.

31. The method of agglomerating and dewatering as recited in claims 1, 12 or 21 wherein said pressing rolls may be driven at variable speeds.

* * * * *